United States Patent
Bennett

(10) Patent No.: US 12,460,763 B2
(45) Date of Patent: Nov. 4, 2025

(54) PIPE REPAIR DEVICE

(71) Applicant: Reginald M. Bennett, Clinton, MS (US)

(72) Inventor: Reginald M. Bennett, Clinton, MS (US)

( * ) Notice: Subject to any disclaimer, the term of this patent is extended or adjusted under 35 U.S.C. 154(b) by 453 days.

(21) Appl. No.: 18/141,027

(22) Filed: Apr. 28, 2023

(65) Prior Publication Data

US 2023/0349501 A1 Nov. 2, 2023

Related U.S. Application Data

(60) Provisional application No. 63/337,262, filed on May 2, 2022.

(51) Int. Cl.
*F16L 55/165* (2006.01)

(52) U.S. Cl.
CPC ......... *F16L 55/165* (2013.01); *F16L 55/1652* (2013.01); *F16L 55/1654* (2013.01); *F16L 55/1656* (2013.01)

(58) Field of Classification Search
CPC . F16L 55/165; F16L 55/1652; F16L 55/1654; F16L 55/1656
See application file for complete search history.

(56) References Cited

U.S. PATENT DOCUMENTS

| | | | |
|---|---|---|---|
| 6,644,356 B1 * | 11/2003 | Connor | B29C 48/12 138/97 |
| 7,942,167 B1 * | 5/2011 | Llewellyn | F16L 55/165 264/269 |
| 9,587,781 B1 * | 3/2017 | Abdulghafoor | F16L 55/165 |
| 9,962,900 B2 * | 5/2018 | Ueda | B32B 1/08 |
| 2004/0037988 A1 * | 2/2004 | Trivelli | F16L 9/147 428/36.91 |
| 2010/0291367 A1 * | 11/2010 | Kosior | C08L 17/00 428/220 |
| 2015/0328857 A1 * | 11/2015 | Ueda | B29C 63/36 138/98 |

* cited by examiner

*Primary Examiner* — Nicholas L Foster
(74) *Attorney, Agent, or Firm* — Intellectual Property Consulting, LLC; Stephen M. Kepper

(57) ABSTRACT

A leak repair device for a pipe comprises a tubular member having an interior surface and an exterior surface with an adhesive or other bonding agent applied to the exterior surface of the tubular member. The tubular member includes a plurality of folds configured to allow the tubular member to expand and contract. This feature allows the leak repair device to be delivered internally to a location within the pipe and then expanded to form a proper seal. An exemplary fold pattern would be the waterbomb origami tube pattern, which can be formed from a single continuous sheet. The aforementioned leak repair device may form a kit with a deployment mechanism operable to inflate the leak repair device at a given location within the damaged pipe.

9 Claims, 6 Drawing Sheets

PIPE REPAIR DEVICE

RELATED APPLICATIONS

This application claims priority to U.S. Provisional Application No. 63/337,262 filed May 2, 2022. The entire contents of the above application are hereby incorporated by reference as though fully set forth herein.

FIELD

The present application relates to a device for repairing leaks in pipes. More particular, the present invention relates to an expandable stent-like tube for internally sealing a pipe.

BACKGROUND

Hindered by an expensive and invasive process, pipe repair is often performed externally and requires excavation. Excavation presents a variety of challenges and is often hindered by multiple obstacles which need to be removed, destroyed, or replaced. Despite all of this effort, once an external repair is complete it often ends in an unreliable patch or external seal that is constantly at odds with the pressure within the pipe, resulting in a repair that frequently needs to be redone or replaced.

BRIEF SUMMARY OF THE INVENTION

The present device would remedy this issue by providing an alternative repair device that is designed to seal any cracks or leaks in the pipe internally. By reaching the damaged portion of a pipe internally, the cost of repair, the effort, and the time required all drastically decrease and the need for excavation obviated.

One embodiment of the invention is a leak repair device comprising a tubular member having an interior surface and an exterior surface with an adhesive or other bonding agent applied to the exterior surface of the tubular member. The tubular member includes a plurality of folds configured to allow the tubular member to expand and contract. This feature allows the leak repair device to be delivered internally to a location within the pipe and then expanded to form a proper seal. An exemplary fold pattern would be waterbomb origami tube pattern.

A second embodiment of the invention includes a kit comprising the leak repair device and the deployment mechanism for delivering the leak repair device to the repair site within the pipe. The deployment mechanism comprises a pipeline pig having a leading end, a trailing end and an intermediate inflatable plug portion. The intermediate inflatable plug portion is operable to expand the leak repair device that is wrapped around that portion of the pipeline pig. In addition, a protective retractable sleeve can be utilized to cover and protect the leak repair device during deployment.

BRIEF DESCRIPTION OF THE DRAWINGS

The foregoing and other objects, features, and advantages of the invention are apparent from the following detailed description taken in conjunction with the accompanying drawings in which like parts are given like reference numerals and, wherein.

Figure 1:
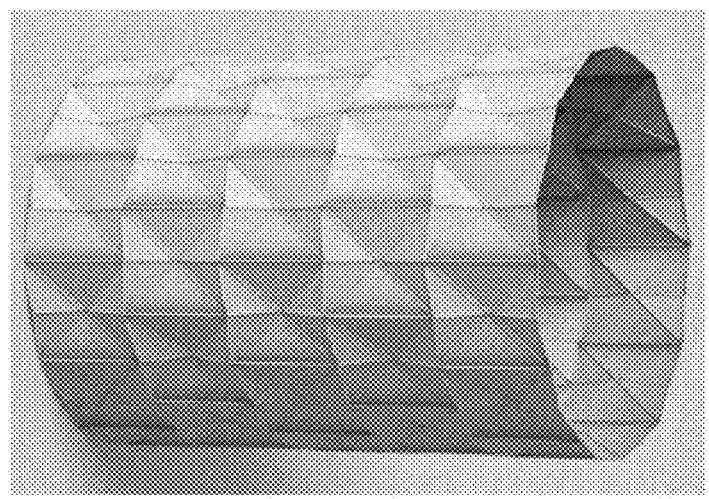
FIG. 1 depicts an isometric view of a pipe repair device according to an embodiment.

The images in the drawings are simplified for illustrative purposes and are not depicted to scale. Within the descriptions of the figures, similar elements are provided similar names and reference numerals as those of the previous figure(s). The specific numerals assigned to the elements are provided solely to aid in the description and are not meant to imply any limitations (structural or functional) on the invention.

The appended drawings illustrate exemplary configurations of the invention and, as such, should not be considered as limiting the scope of the invention that may admit to other equally effective configurations. It is contemplated that features of one configuration may be beneficially incorporated in other configurations without further recitation.

DETAILED DESCRIPTION

For a further understanding of the nature and function of the embodiments, reference should be made to the following detailed description. Detailed descriptions of the embodiments are provided herein, as well as, the best mode of carrying out and employing the present invention. It will be readily appreciated that the embodiments are well adapted to carry out and obtain the ends and features mentioned as well as those inherent herein. It is to be understood, however, that the present invention may be embodied in various forms. Therefore, persons of ordinary skill in the art will realize that the following disclosure is illustrative only and not in any way limiting, as the specific details disclosed herein provide a basis for the claims and a representative basis for teaching to employ the present invention in virtually any appropriately detailed system, structure or manner. It should be understood that the devices, materials, methods, procedures, and techniques described herein are presently representative of various embodiments. Other embodiments of the disclosure will readily suggest themselves to such skilled persons having the benefit of this disclosure.

The disclosed invention is a pipe repair device capable of internally sealing a leaking pipe using an expandable, stent-like tube. The invention will be described below relative to certain illustrative embodiments, and though those skilled in the art will recognize that the invention is not limited to the described embodiments.

Figure 2:
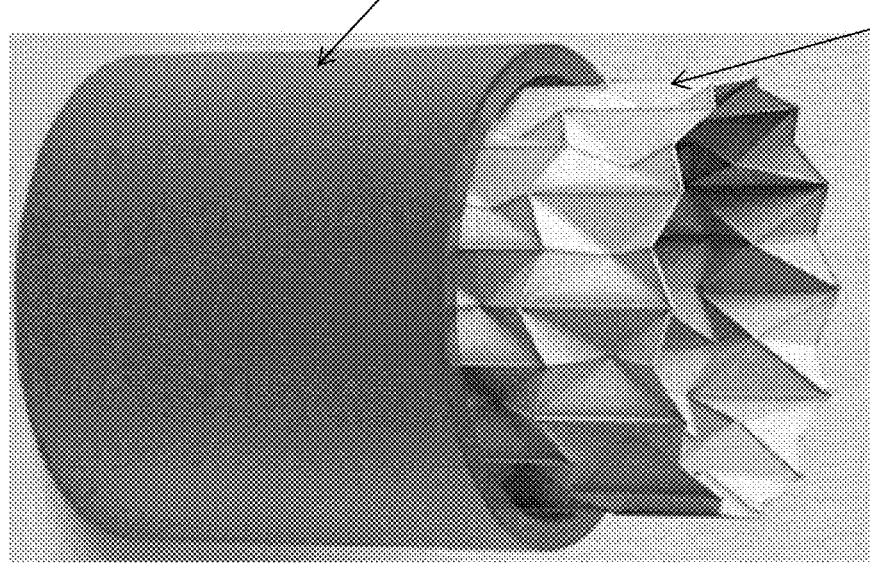
FIG. 2 depicts an isometric view of the pipe repair device of FIG. 1 inserted in a pipe.

Referring to FIGS. 1 and 2, a pipe repair device 10 for sealing a pipe 16 from the interior comprises a collapsible and expandable tube having an exterior surface 12 coated in an adhesive material for sealing the pipe 16 in the area of a leak or breach. When expanded, the pipe repair device 10 matches the inner diameter of the pipe 16 to push against the walls of the pipe and seal the leak or breach. The pipe repair device 10 may initially be in a collapsed position to allow movement through the pipe 16 to the area requiring repair.

Figure 3:
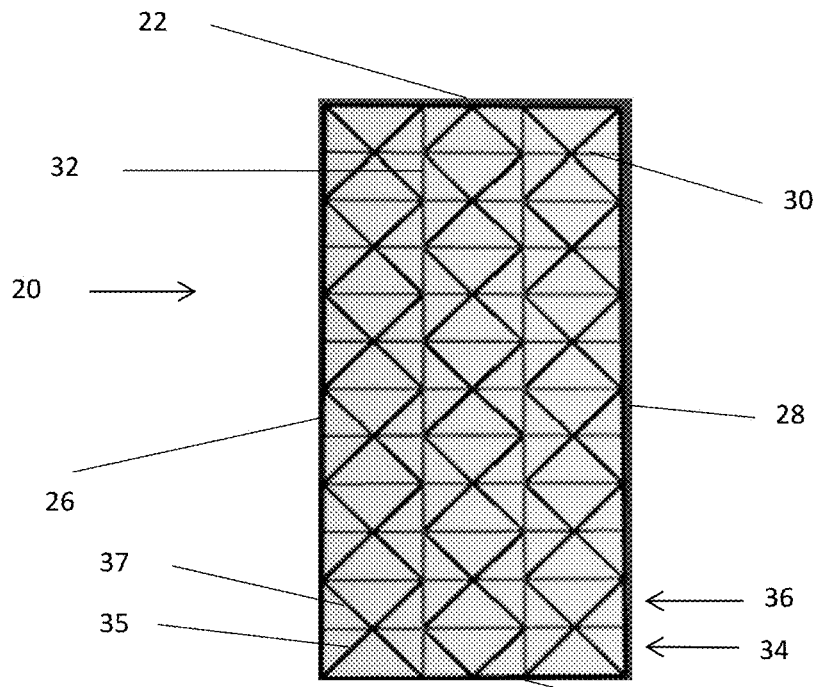
FIG. 3 shows a sheet of material folded in an origami waterbomb pattern suitable for forming the pipe repair device of FIG. 1.

As shown in FIG. 3, the pipe repair device 10 comprises a sheet 20 of material having a pattern of folds. The sheet extends longitudinally from a first end 22 to a second end 24 and laterally from a first side 26 to a second side 28. The folding pattern is known as a "waterbomb origami tube pattern" and comprises evenly spaced apart longitudinal folds 30 extending from the first end 22 to the second end 24 intersecting evenly spaced apart circumferential folds 32. The separation distance between the circumferential folds 32 is about twice the separation distance of the longitudinal folds 30 to form a pattern of squares, with each square bisected by a longitudinal fold. The illustrative longitudinal folds 30 and circumferential folds 32 are "hill folds" formed by etching material from an inner surface of the sheet. The sheet 20 further includes transverse "valley" folds 35 formed by etching material from an outer surface of the sheet 20. A first column 34 of rectangles includes crisscrossing transverse valley folds 35. An adjacent column 36 of rectangles includes transverse valley folds 37 offset longitudinally from the crisscrossing transverse valley folds in the first column 34. The transverse valley folds 35, 37 form a pattern of diamond shaped offset longitudinally from each other. Another way to describe the waterbomb origami tube patterns is of a reoccurring six-crease pattern with two colinear hill creases and four diagonal valley ones intersecting at a common vertex.

The illustrative sheet 20 is formed of a continuous material that is etched to form the pattern of folds, rather than a weave. In one embodiment, the sheet 20 comprises an industrial material, such as aramid fibers, rubber, non-asbestos fibers, flexible graphite and combinations thereof, as well as other suitable materials known in the art. The invention is not limited to the described materials, and the sheet 20 may comprise any suitable material capable of forming the waterbomb origami tube pattern and sufficiently sealing a leak in a pipe that are compatible with the pipe inner wall and fluid within the pipe. The leak repair device 10 can be adapted for various fluid applications, such as water, petroleum, natural gas, steam or any fluid flowing through a conduit.

Figure 4:
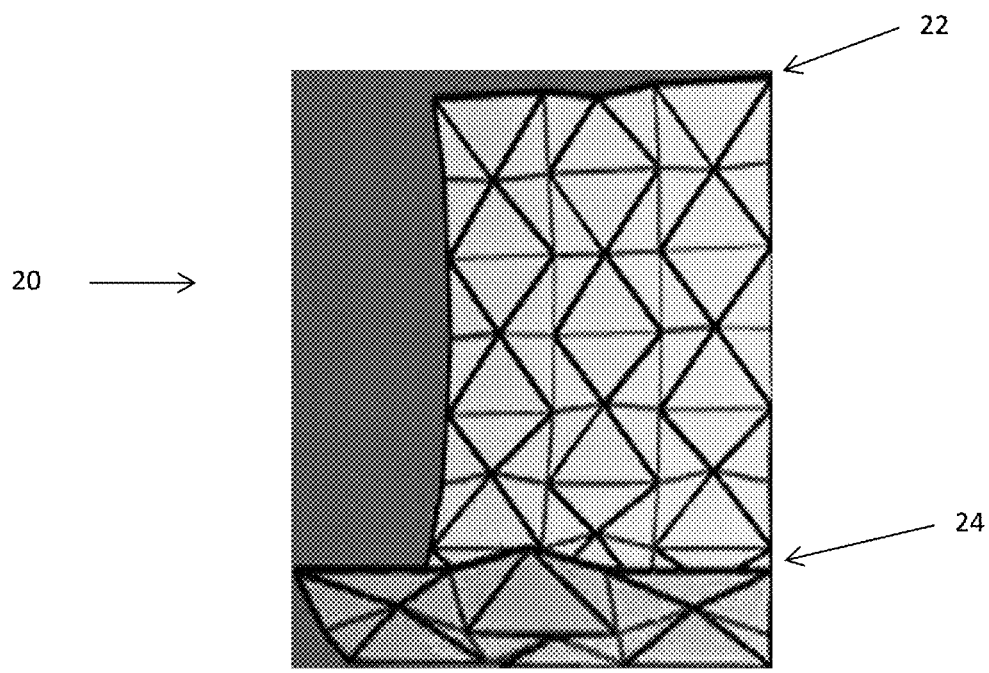
FIG. 4 shows the sheet of material of FIG. 3 during rolling to form the pipe repair device of FIG. 1.
Figure 5:
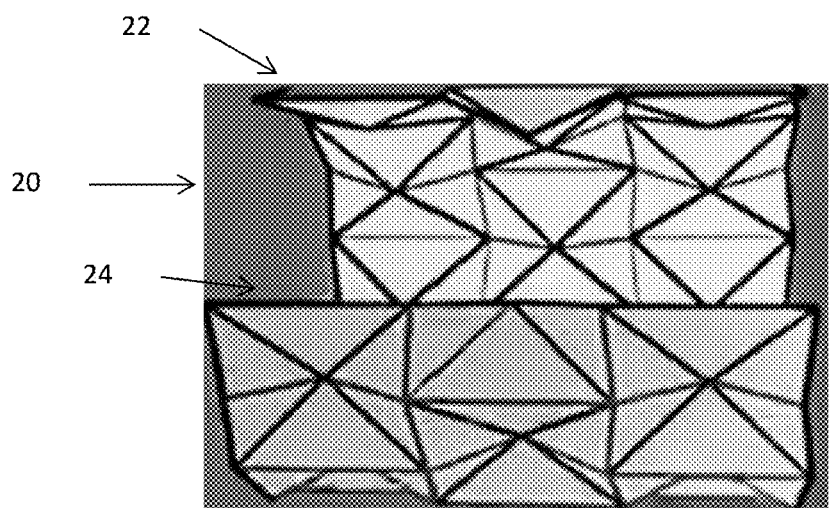
FIG. 5 shows the sheet of material of FIG. 4 during further rolling to form the pipe repair device.
Figure 6:
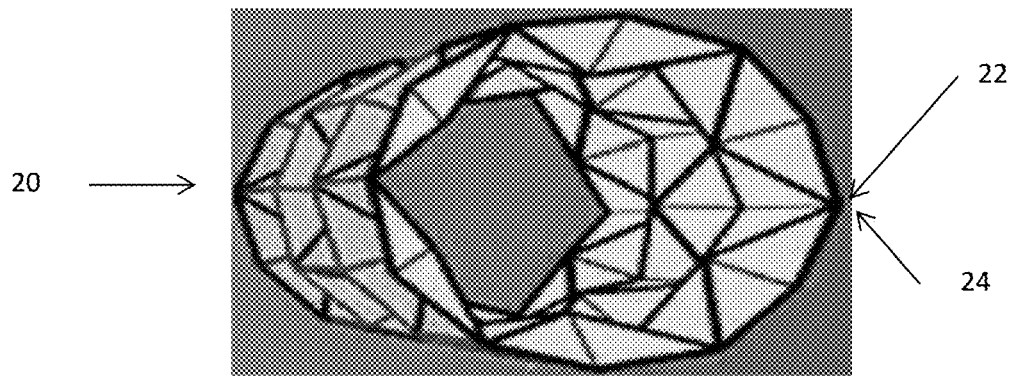
FIG. 6 shows the sheet of material of FIG. 4 after formation of the tubular structure of the pipe repair device.

As shown in FIGS. 4-6, the illustrative folded sheet 20 may be rolled to form a tubular member, collapsible and expandable structure 10 by first rolling the sheet 20 and then joining the first end 22 to the second end 24 using an adhesive, binding agent, or fastener sufficient to provide a leak proof seal.

Figure 7:
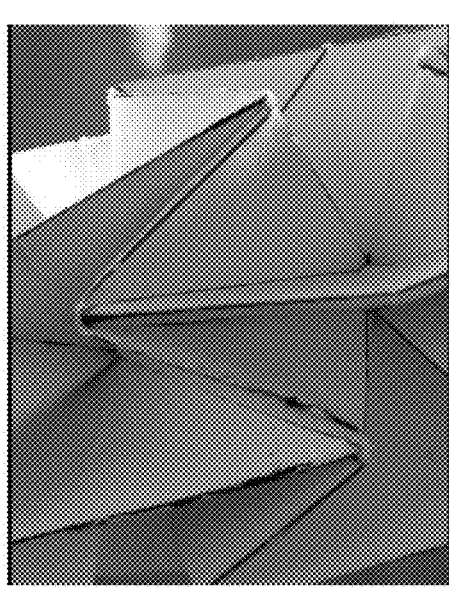
FIG. 7 is a detailed view of the pipe repair device of FIG. 1 in a collapsed position.
Figure 8:
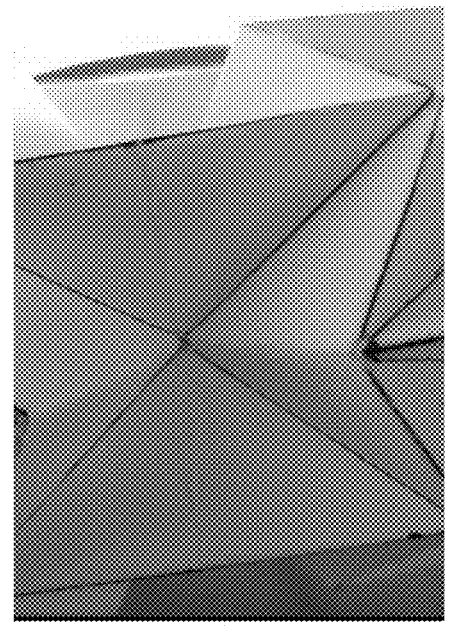
FIG. 8 is a detailed view of the pipe repair device of FIG. 1 in an expanded position.

FIG. 7 illustrates a portion of the device 10 in a collapsed state, and FIG. 8 shows a portion of the device 10 in an expanded state.

Figure 9:
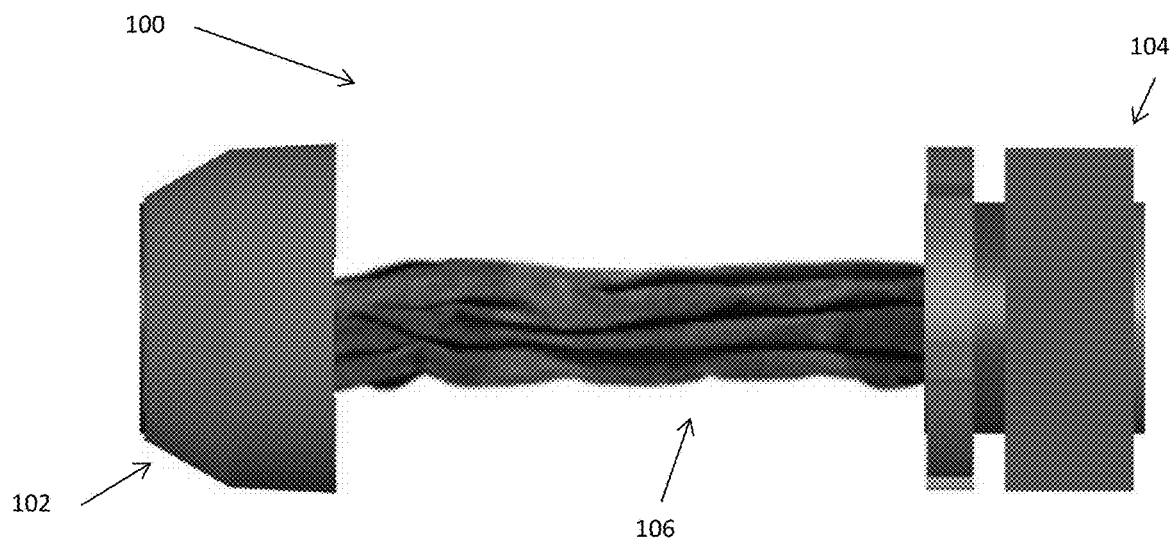
FIG. 9 is a side view of a deployment mechanism suitable for deploying the pipe repair device and showing the inflatable plug portion in a collapsed position.
Figure 10:
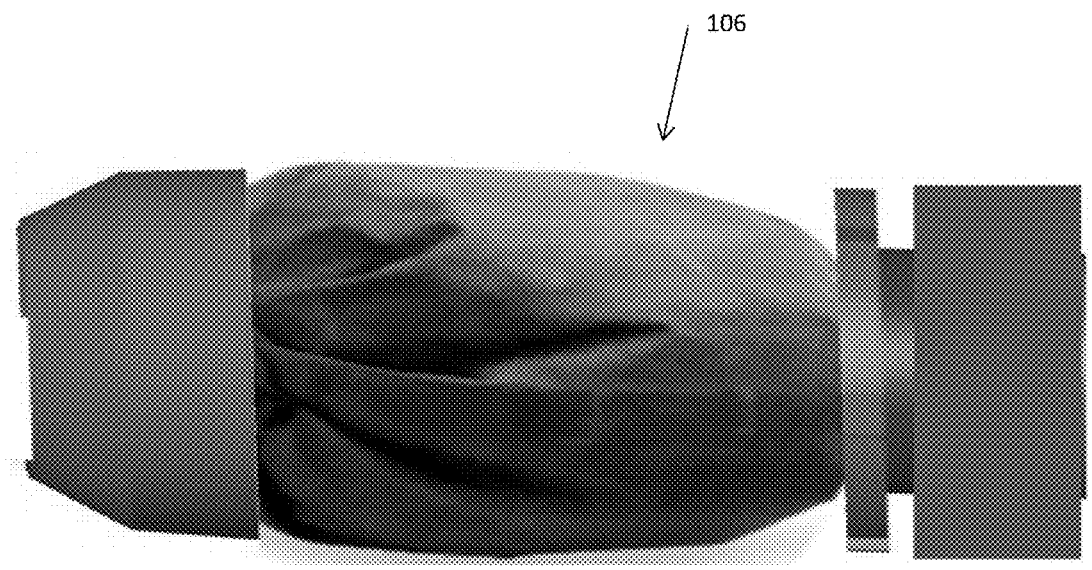
FIG. 10 is a side view of a deployment mechanism suitable for deploying the pipe repair device and showing the inflatable plug portion in an expanded position.
Figure 11:
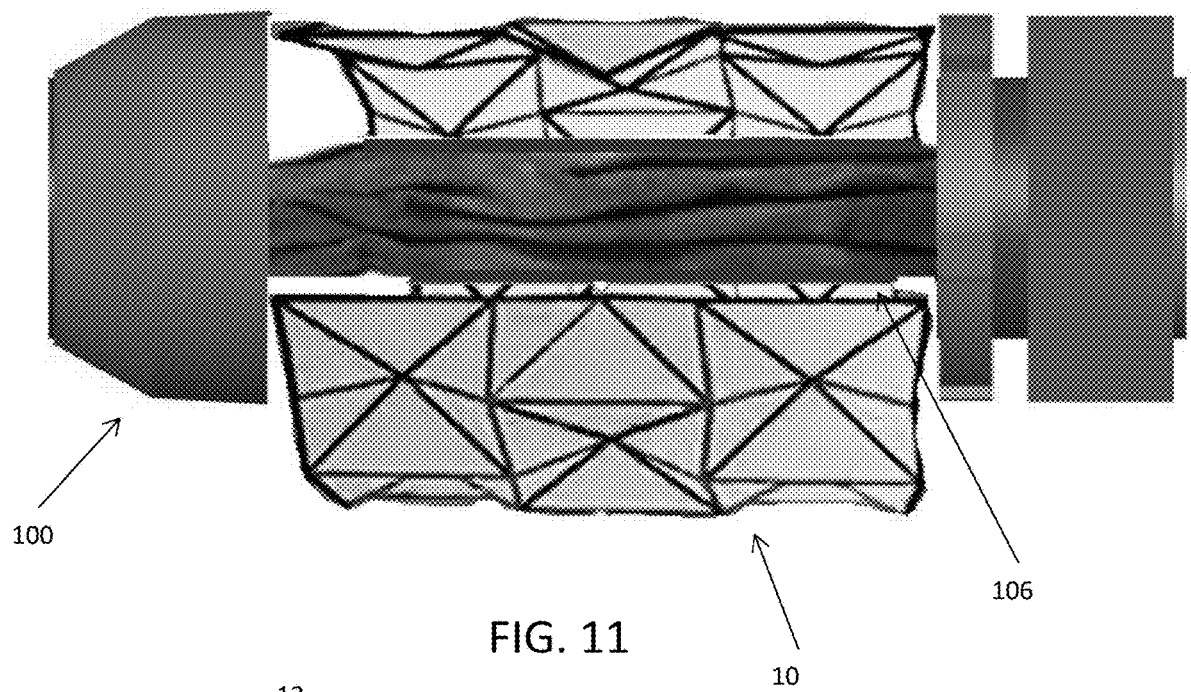
FIG. 11 is a side view of a deployment mechanism suitable for deploying the pipe repair device and showing the pipe repair device partially wrapped around the inflatable plug portion in a collapsed position.
Figure 12:
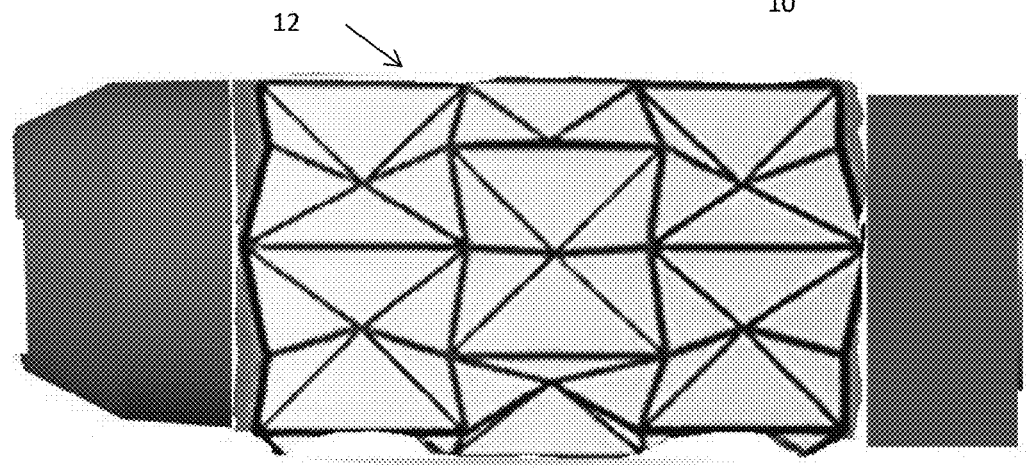
FIG. 12 is a side view of a deployment mechanism suitable for deploying the pipe repair device and showing the pipe repair device wrapped around the inflatable plug portion in an expanded position.

The device 10 may be collapsed to easily move through a damaged pipe 16 to a leak site. When the device 10 reaches the leak site, a deployment mechanism 100 can expand the device 10 to match the interior diameter of the pipe 16. FIGS. 9 and 10 show an example of a deployment mechanism 100 suitable for deploying the pipe repair device 10. The illustrative deployment mechanism 100 comprises a pipeline pig having a leading end 102, a trailing end 104, and an intermediate inflatable plug portion 106. The inflatable plug portion 106 may be deflated, as shown in FIG. 9, to allow wrapping and installation of the device 10 around the deflated plug portion 106, as shown in FIG. 11. Then, the deployment mechanism 100 with the mounted leak repair device 10 moves through the pipe 16 to a damaged region in the pipe 16. The inflatable plug portion 106 may be inflated through inflation means known in the art (e.g. compressed air or gas) or otherwise expanded, as shown in FIGS. 10 and 12, to expand the leak repair device 10 into engagement with the interior of the pipe 16 in the vicinity of a leak. As the plug portion 106 inflates, the device 10 expands, and the adhesive on the outer surface 12 of the device 10 adheres to the inner surface of the pipe to seal the leak and retain the leak repair device 10 in the expanded, sealed position. After curing of the adhesive, the plug portion 106 can deflate and be extracted from the pipe while leaving the leak repair device 10 in the expanded, sealed position.

Figure 13:
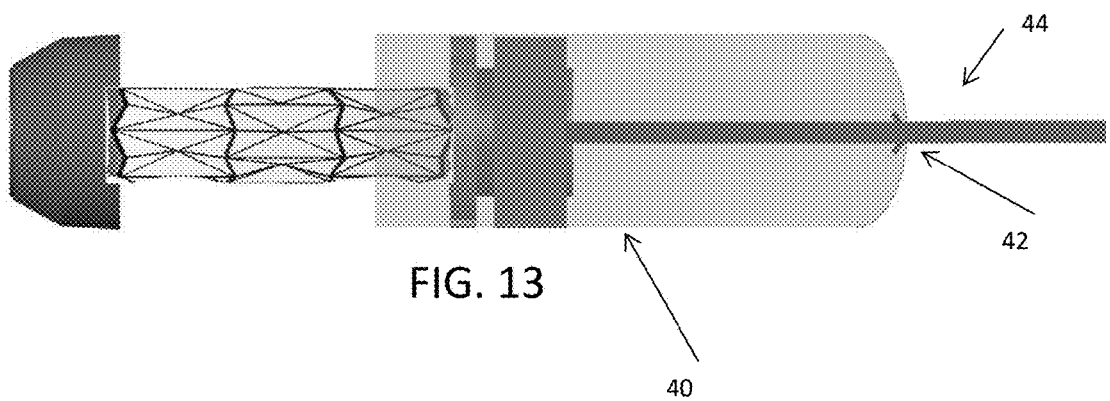
FIG. 13 is a side view of a deployment mechanism showing the protective sleeve partially removed from the inflatable plug portion.
Figure 14:
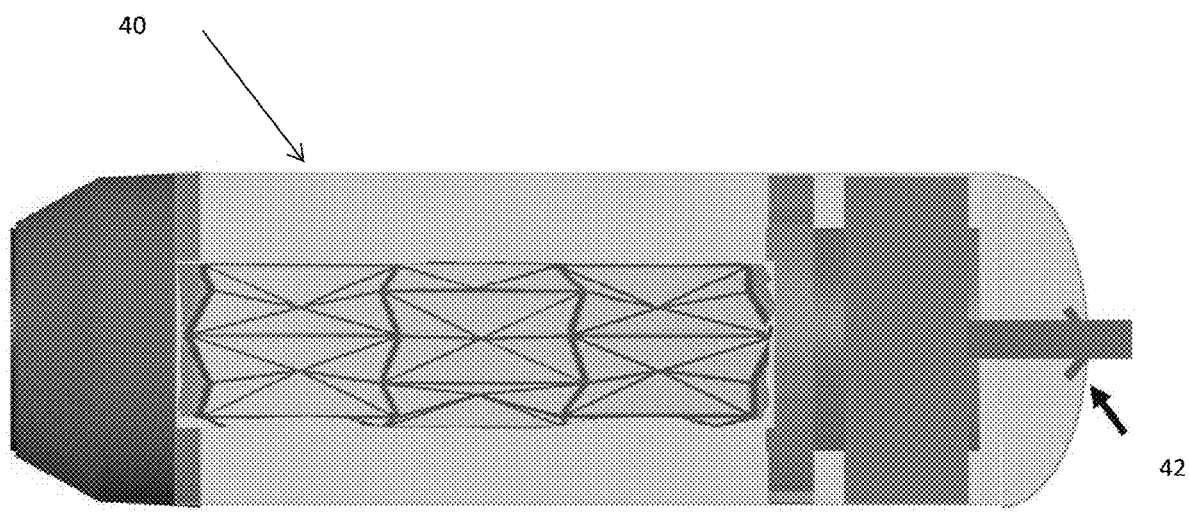
FIG. 14 is a side view of a deployment mechanism showing the protective sleeve covering the inflatable plug portion.

As shown in FIG. 13 and FIG. 14, a protective sleeve 40 may be utilized to cover the deployment mechanism 100 and sheet 20 during deployment. As shown in FIG. 14, during deployment, the protective sleeve 40 covers the sheet 20. Moreover, the preferred embodiment keeps the sleeve 40 offset from the sheet 20 so as to not interfere with the adhesive. As shown in FIGS. 13-14, this can be accomplished by having a larger diameter for the leading end 102 and trailing end 104, when compared to the intermediate inflatable plug portion 106 when it is deflated, and configuring the sleeve 40 to be attached to those ends 102, 104 such that the sleeve 40 maintains roughly the same diameter and is offset from the inflatable plug portion 106. Once in position and as shown in FIG. 13, two tabs 42 engage the protective sleeve 40. Once engaged, a tetherline 44 is activated by the user, removing the sleeve 40, and exposing the sheet 20.

The invention is not limited to the illustrative embodiments and encompasses variations and alterations of these embodiments. Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims. For the purposes of promoting an understanding of the principles of the invention, reference has been made to the preferred embodiments illustrated in the drawings, and specific language has been used to describe these embodiments. However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the system (and components of the individual operating components of the system) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A leak repair device comprising:
    a tubular member having an interior surface and an exterior surface, said tubular member comprising a plurality of folds configured to allow the tubular member to expand and contract,
    wherein said plurality of folds are configured to form a waterbomb origami tube pattern.

2. The leak repair device of claim 1, wherein the exterior surface of said tubular member comprises an adhesive.

3. The leak repair device of claim 1, wherein the tubular member comprises a material selected from the group consisting of aramid fibers, rubber, non-asbestos fibers, flexible graphite, or any combination thereof.

4. A leak repair kit comprising:
    a leak repair device comprising a tubular member having an interior surface and an exterior surface, said tubular member comprising a plurality of folds configured to allow the tubular member to expand and contract, wherein said plurality of folds are configured to form a waterbomb origami tube pattern, and
    a deployment mechanism configured to store said leak repair device, said deployment mechanism comprising a pipeline pig having a leading end, a trailing end and an intermediate inflatable plug portion, wherein said intermediate inflatable plug portion is operable to expand the leak repair device.

5. The leak repair device of claim 4, wherein the exterior surface of said tubular member comprises an adhesive.

6. The leak repair kit of claim 4, wherein the leak repair device is sized and dimensioned to wrap around the inflatable plug portion while the inflated plug portion is in a deflated position.

7. The leak repair kit of claim 6, wherein the deployment mechanism comprises a protective sleeve configured to cover the leak repair device.

8. The leak repair kit of claim 7, wherein the deployment mechanism comprises a means for removing the protective sleeve from the pipeline pig.

9. The leak repair device of claim 4, wherein the tubular member comprises a material selected from the group consisting of aramid fibers, rubber, non-asbestos fibers, flexible graphite, or any combination thereof.

* * * * *